(12) United States Patent
Vazhenin et al.

(10) Patent No.: US 11,035,960 B1
(45) Date of Patent: Jun. 15, 2021

(54) BLOCK OF DIGITAL FILTERS FOR MULTISYSTEM NAVIGATIONAL RECEIVERS INTEGRATED WITH DATA TRANSMISSION SYSTEMS

(71) Applicant: Topcon Positioning Systems, Inc., Livermore, CA (US)

(72) Inventors: Nikolay Afanasievich Vazhenin, Moscow (RU); Andrey Vladimirovich Veitsel, Moscow (RU); Vladimir Victorovich Veitsel, Moscow (RU); Igor Anatolievich Orlovsky, Moscow (RU); Leonid Victorovich Purto, Moscow (RU); Dmitry Anatolyevich Rubtsov, Moscow (RU); Fedor Borisovich Serkin, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 503 days.

(21) Appl. No.: 16/088,957

(22) PCT Filed: Mar. 22, 2018

(86) PCT No.: PCT/RU2018/000182
§ 371 (c)(1),
(2) Date: Sep. 27, 2018

(87) PCT Pub. No.: WO2019/182469
PCT Pub. Date: Sep. 26, 2019

(51) Int. Cl.
*G01S 19/35* (2010.01)
*G01S 19/41* (2010.01)
(Continued)

(52) U.S. Cl.
CPC .............. *G01S 19/35* (2013.01); *G01S 19/33* (2013.01); *G01S 19/41* (2013.01); *H04B 1/0007* (2013.01)

(58) Field of Classification Search
CPC ........... G01S 19/35; G01S 19/33; G01S 19/41
(Continued)

(56) References Cited

U.S. PATENT DOCUMENTS

| 7,764,226 B1* | 7/2010 | Veitsel | G01S 19/33 |
| | | | 342/357.73 |
| 2016/0299232 A1* | 10/2016 | Veitsel | G01S 19/33 |

FOREIGN PATENT DOCUMENTS

RU  126849 U1  4/2013

OTHER PUBLICATIONS

Search Report in PCT/RU2018/000182, dated Dec. 27, 2018.

* cited by examiner

*Primary Examiner* — Bo Fan
(74) *Attorney, Agent, or Firm* — Bardmesser Law Group (57) ABSTRACT

Navigation receiver includes antennas receiving signals from different satellite constellations, Low Noise Amplifiers, a Block of Analog Filters, a Block of Quadrature mixers (BQM) translating in phase and quadrature signals to an intermediate frequency, analog converters digitizing the in phase and quadrature signals, a Block of Digital Quadrature Mixers (BDQM) shifting the digitized signals to zero frequency, a Set Block of Digital Filters (SBDF) band-pass filtering the shifted signals, and reducing a sampling rate, and a Block of Digital Processing (BDP) calculating coordinates, all series-connected; a Block of Digital Generators (BDG) for fine control of the BDQM; and a Block of Analog Generators (BAG) that defines which signal is processed by its corresponding BQM; SBDF including Blocks of Digital Filters (BDFs), each BDF including a chain of Blocks of MultiRate Filters for antialiasing filtering/down-sampling of shifted signals, programmable commutators for controlling decimation, and FIR-filters; each BDF controlled by control block.

22 Claims, 8 Drawing Sheets

(51) Int. Cl.
*G01S 19/33* (2010.01)
*H04B 1/00* (2006.01)

(58) Field of Classification Search
USPC ............ 342/357.24, 357.42, 357.44, 357.73, 342/357.76
See application file for complete search history.

BLOCK OF DIGITAL FILTERS FOR MULTISYSTEM NAVIGATIONAL RECEIVERS INTEGRATED WITH DATA TRANSMISSION SYSTEMS

BACKGROUND OF THE INVENTION

Field of the Invention

The present invention relates generally to digital systems of receiving and processing signals and more particularly to enhancing efficiency of technical implementation, interference immunity and positioning accuracy of multisystem navigation receivers integrates with data transmission systems.

Description of the Related Art

Modern navigation receivers are generally multi-system, that is they support operation with signals of several global satellite navigation systems, such as GPS, GLONASS, Galileo, Beidou, etc.

Moreover, sophisticated ASICs for navigation receivers provide integration of algorithms for digital processing of navigation signals with similar algorithms of data transmission, for example, reception of differential corrections from a base station. Data transmission can be for example implemented by LTE modems, Wi-Fi, specialized modems and so on, which are integrated in a navigation ASIC.

In this connection, the task of integrating separate fragments of digital processing algorithms used in navigation and communication subsystems of the navigation receiver is extremely important. In particular, such a task arises when digital filters providing a required level of receiver's selectivity and interference immunity are developed.

Some modifications of navigation receivers are described in U.S. Pat. Nos. 7,894,788, 7,912,158, US Patent Publication No. 20140028499, U.S. Pat. No. 8,604,974 and others.

Various architecture designs of digital filters are described in U.S. Pat. Nos. 5,732,004, 6,834,292, 7,369,989, 4,766,562, 5,842,156, 6,236,731, 7,028,061, 8,073,894, 8,077,880, 8,417,749, US Patent Publication No. 2009/0177726, and others.

Different modifications of designs for Moving Average Filters (MAF) are described in, e.g., U.S. Pat. Nos. 4,232,192, 5,440,503, 6,304,133 and so on.

U.S. Pat. No. 8,380,772 describes a multi-rate filter bank comprising a chain of decimators, a multiplexer, and an anti-aliasing filter. However, the set of filters does not possess characteristics required in multi-system navigation receivers, since it does not have needed amplitude-frequency responses and tools providing necessary control.

U.S. Pat. No. 8,176,107, entitled "Multi-standard multi-rate filter," describes a decimation method by a factor of M and its adjustment with the assigned frequency range of a channel. The method includes a few successive stages of digital filtration and a further stage of signal decimation. However, this technical solution is intended for digital filters with infinite-impulse response (IIR-filters) and does not provide programmable control of the decimation factor and through amplitude-frequency characteristic of the block of filters. Note that in multi-system navigation receivers, transversal filters are generally used, and programmable control of their characteristics is required.

Accordingly, the present invention is directed to improving conventional technical solutions in this field.

SUMMARY OF THE INVENTION

The proposed invention is directed to enhancing functionality and programmatically-algorithmical versatility of a digital filter block for multi-system navigation receivers integrated with data transmission systems.

The proposed invention covers digital multi-system navigation receivers integrated with data transmission systems, in particular implemented in the form of ASIC or FPGA, although other implementations (such as using discrete components or processor-and-software-based implementions) are also contemplated.

Such receivers are characterized by availability of many channels of signal reception (over ten separate frequency channels are possible), each of which is specific in the width of the used bandwidth (from tens of kHz up to tens of MHz), its sampling rate and own requirements to Amplitude Frequency Response—AFR—of the channel digital filter.

Another feature of these receivers is the necessity of changing characteristics of each channel, including input and output sampling frequency, digital filter coefficients, etc., during operation.

These requirements are redundant, and, in fact, make it difficult in practice to implement a set of such channels, considering their "hardware" implementation requirements for each possible set of parameters. At the same time, pure programmable implementation of these channels and filters also faces technical difficulties, since it needs to use high-performance, i.e., requiring the use of expensive high-end processors.

To that end, the task of creating technical solutions guaranteeing programmable-controlled structures with "soft" and "hard" logic is now especially relevant.

The technical result from using the proposed invention is improving functionality and programmatically-algorithmic flexibility of a digital filter block utilized for solving various tasks in multi-system digital navigation receivers and digital receivers of differential correction signals from a base station. Moreover, the proposed technical solution results in reducing the area in ASIC or FPGA required for an implementation of the digital filter block.

The proposed object is achieved by providing universality and parametric and structural flexibility in implementing the block of digital filters. This is guaranteed by a capability of parametric control over a structural chain of digital filters, as well as uploading required coefficients in each of used FIR filters from the database of the given coefficients.

U.S. Pat. No. 8,176,107 entitled "Multi-standard multi-rate filter", describes a receiver for multi-system signals successively-connected decimating (multi-rate) filters, commutators, and finite-impulse response (FIR) filters. However, this reference is not easily configurable or adaptable.

A feature of the proposed block, in the present invention, that addresses some of those shortcomings, is the use of Block Multi-Rate Filters (BMRF);

BMRF have parametrically-controlled structure and parameters uploaded depending on the required mode of the usage;

decimation coefficient of BMRF is also programmable and depends on filters' implementation mode;

FIR (Finite Impulse Response) filters can be used separately, providing the required amplitude-frequency response (AFR), as well as in the form of a chain of series-connected filters, one of which corrects AFR of the BMRF chain and the other generates the needed AFR.

To that end, and with further reference to FIGS. 1-8, a multisystem navigation receiver integrated with data transmission systems includes a series-connected antenna block ($A_1 \ldots A_N$) and a Block of Low Noise Amplifiers (BLNA) (101), a Block of Analog Filters (BAF) (102), a Block of Quadrature Mixers (BQM) (103), a Block of Quadrature Analog-to-Digital Converters (BQADC) (104), a Block of Digital Quadrature Mixers (BDQM) (105), a Set Block of Digital Filters (SBDF) (106), a Block of Digital Processing (BDP) (107), as well as a Block of Digital Generators (BDG) (108) and a Block of Analog Generators (BAG) (109), whose inputs are connected to the control outputs of BDP (107), and the outputs—with control inputs of blocks BDQM (105) and BQM (103) correspondingly. The SBDF (106) is made in the form of the corresponding number of independent Blocks of Digital Filters (BDF) (110), each of which includes a chain of Blocks of MultiRate Filters (BMRF) (202, 206, 207 and 209) providing preliminary filtration and down-converting of discretization frequency, programmable-controlled commutators (201, 203, 205 and 208), and a chain of FIR-filters (204, 210) implementing filtration on modulated/down sampling frequency; the functioning of BDF (110) is controlled by Control block (211) generating control signals of separate elements of the block of digital filters based on the pre-written data files and the assigned number NVar fed to the Control Block (211).

In an embodiment, a multisystem navigation receiver (meaning, a receiver that can receive signals from multiple satellite constellations, such as GLONASS, Beidou, GPS, Galileo), with all of its digital components preferably integrated on a single integrated circuit), the receiver comprising:

(i) an antenna block including a plurality of antennas receiving GNSS signals from a plurality of satellites belonging to different satellite constellations, (ii) a block of Low Noise Amplifiers (BLNA) amplifying the GNSS signals received by the antennas, (iii) a Block of Analog Filters (BAF) filtering the amplified GNSS signals (in essence, each analog filter is a bandpass filter for the particular GNSS constellation, such as for Beidou, GPS, or Galileo, etc.), (iv) a Block of Quadrature mixers (BQM) translating in phase and quadrature signals representing the GNSS signals to an intermediate frequency, typically tens of MHz, (v) a Block of Quadrature Analog-to-Digital Converters (BQADC) converting the in phase and quadrature signals to digital form, (vi) a Block of Digital Quadrature Mixers (BDQM) for shifting the digitized in phase and quadrature signals from the intermediate frequency to a zero frequency, (vii) a Set Block of Digital Filters (SBDF) band-pass filtering the shifted in phase and quadrature signals, and reduces a sampling rate of the shifted in phase and quadrature signals, (viii) a Block of Digital Processing (BDP) for calculating a position of the navigation receiver based on the output of the SBDF, all the elements (i)-(viii) connected in series;

(ix) a Block of Digital Generators (BDG) receiving inputs from the BDP and whose outputs provide for fine control the BDQM, in order to make the frequency shifting by the BDQM more precise, and (x) a Block of Analog Generators (BAG) that outputs harmonic signals that define which signal, in each channel, are processed by its corresponding BQM wherein the SBDF includes a plurality of independent Blocks of Digital Filters (BDF), each BDF including (i) a chain of Blocks of MultiRate Filters (BMRF) providing anti-aliasing filtering and down-sampling of the shifted in phase and quadrature signals, e.g., from 100 megasamples per second to 50, or 25 Megasamples per second—each ADC works at some sampling frequency, such 200 MHz, so each ADC can digitize a signal at 100 Megasamples per second. However, actual GNSS systems have much lower-frequency signals, so there is no reason to sample at a rate that high), (ii) programmable commutators for configuring the BMRF and controlling decimation of the down-sampled signals from the BMRF, and (iii) a chain of FIR-filters for filtering the down-sampled signals, each BDF being controlled by a control block generating control signals for components of the BDF based on pre-written data and an assigned number fed to the Control Block.

The proposed device is illustrated in FIGS. 1-8, and represents a block of digital filters for multi-system navigation receivers integrated with data transmission systems. The block includes a set of decimating (multi-rate) filters, commutators, and digital filters with finite impulse response (FIR), the signals from quadrature analog-digital converters (ADC) being fed to a series-connected first commutator (201), a first block of Block MultiRate Filters (BMRF) (202), a second commutator (203), a first FIR filter (204) and a third commutator (205), as well as a second BMRF (206), a third BMRF (207), a fourth commutator (208), a fourth BMRF (209), a second FIR filter (210) and a Control Block (211). The inputs of the first commutator (201) are the inputs of the digital filter block, and the output of the third commutator (205) is its output, the output of first BMRF (202) is also connected to a signal input of the second BMRF (206), the output of which is connected to the second input of the second commutator (203) and a signal input of the third BMRF (207), the output of which is connected to a third input of second commutator (203) and a first input of fourth commutator (208), whose output is connected to the fourth input of the second commutator (203) via the fourth BMRF (209), the second input of the fourth commutator (208) is connected to the output of the first commutator (201), and the output of first FIR filter via second FIR filter is connected to second input of third commutator (205). The control Block (211) generates control signals for separate elements of the block of digital filters based on pre-recorded data files and the number of the implemented version of the digital filter NVar, which is fed to the input of the Control Block (211). The control Block (211) has eight outputs, the first one outputs clock signals of the first type $Clk_{1ij}$ corresponding to the sampling frequency of the input signals of the BMRF blocks, the second output gives clock signals of the second type $Clk_{2i}$ corresponding to the sampling frequency of the FIR filters, the third output gives clock signals of the third type $Clk_{3ij}$ corresponding to the output sampling frequency of the BMRF block, and the fourth output outputs a vector of parameters $MRF_{ij}$ describing the adjustment of the BMRF block, the fifth output gives a vector of parameters $DS_{ij}$ describing parameters of decimation in the BMRF blocks, the sixth output gives a vector of parameters $FIR_{ki}$ describing parameters and coefficients of the FIR filters, the seventh output outputs a vector of parameters $Var_i$ which controls commutators' operation, and the eighth one outputs a vector of parameters $Power_i$ controlling power supply to separate elements of the block of digital filters. The index i determines the number of the functioning version for the block of digital filters, the index j determines the number of the BMRF block, and the index k determines the number of FIR filter.

Figure 2:
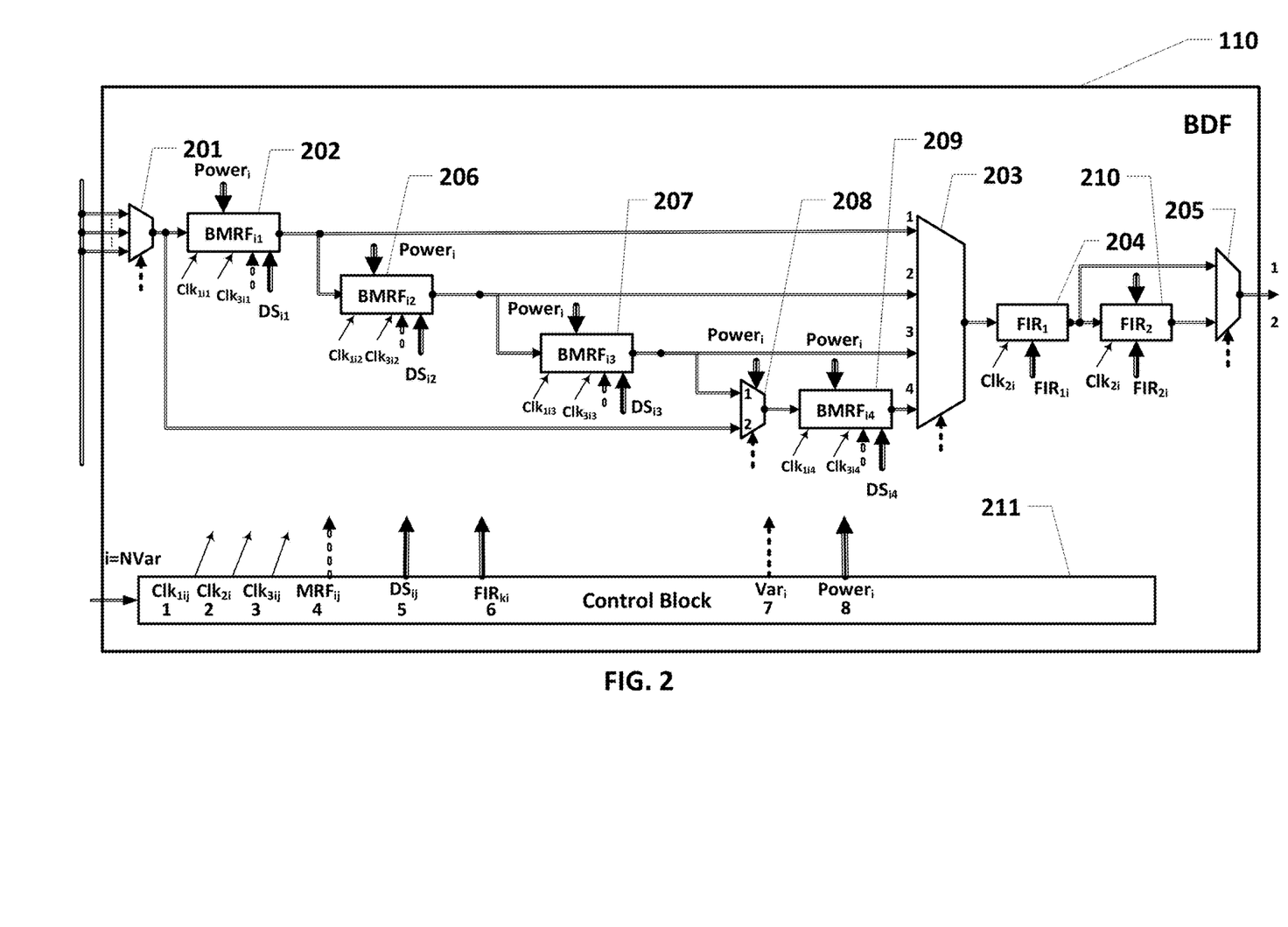
FIG. 2 shows a general structural diagram of a BDF (Block of Digital Filters) for a multi-system navigation receiver with integrated data transmission system.

Control outputs of the control block (211) are connected to the corresponding control inputs of blocks being a part of the block of digital filters.

Figure 3:
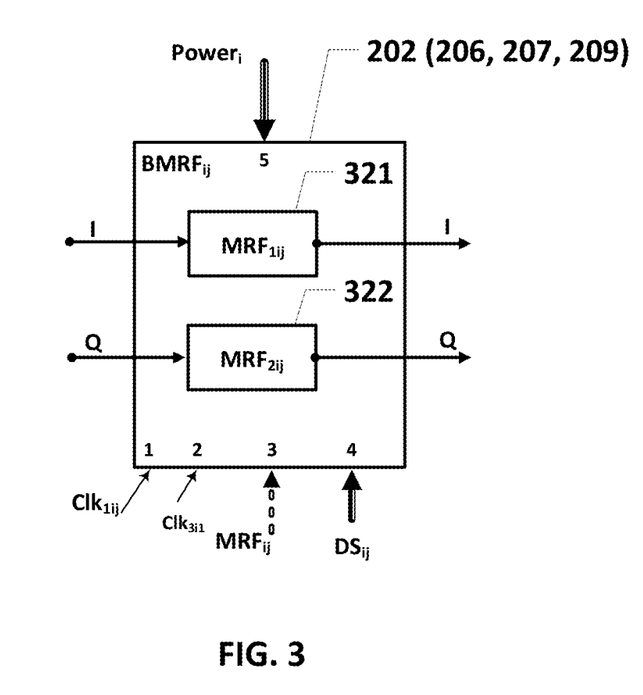
FIG. 3 shows a structural diagram of an embodiment of a Block of MultiRate Filters (BMRF) for the case of transmitting in-phase and quadrature samples of the input signal in separate lines.

An embodiment of the proposed device is the case when transmitting in-phase and quadrature components of the input signal in separate channels is implemented via the block of multi-rate filters (BMRF) (202, 206, 207, 209) in the form of two channels each of which contains MultiRate Filter (MRF), (321) and (322) correspondingly. Control inputs of the BMRF are connected to the corresponding control inputs of the first (321) and second (322) MRFs.

Figure 4:
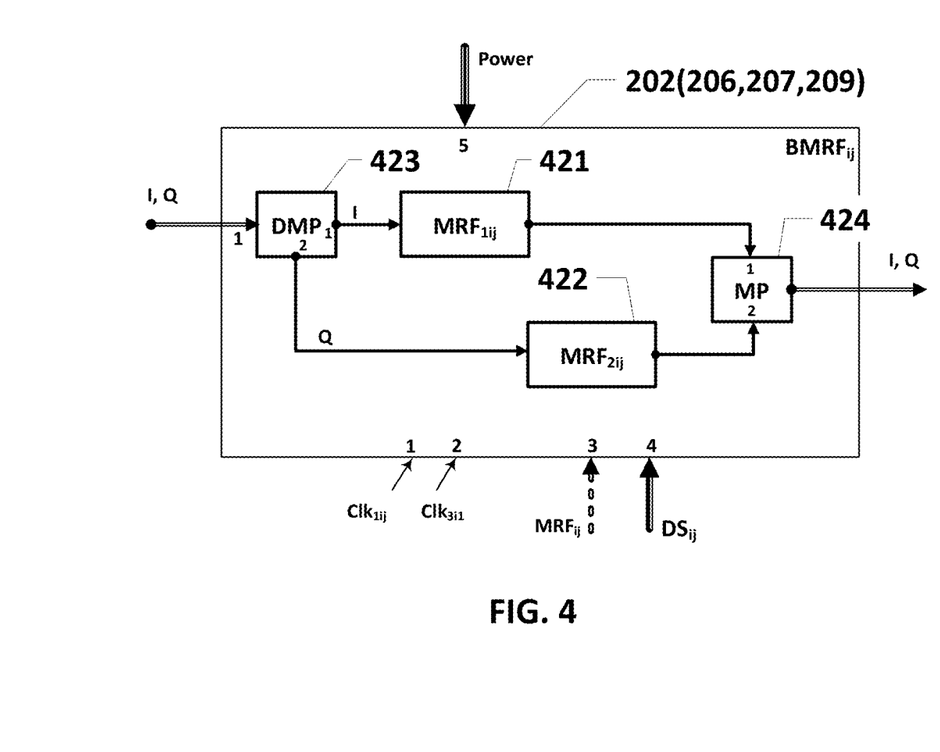
FIG. 4 shows a structural diagram of an embodiment of a Block of MultiRate Filters (BMRF) for the case of series-transmitting in-phase and quadrature samples of the input signal in one line.

Another embodiment of the proposed invention is the case of series-transmitting in-phase and quadrature components of the input signal in the same channel, and the BMRF block (202, 206, 207, 209) is made in the form of a series-connected demultiplexer (423), a first MRF (421), multiplexer (424), the input of the demultiplexer (423) being the input of BMFR, and the output of a multiplexer (424) being its output, and the BMRF contains another MRF (422), the input of which is connected with the second output of the demultiplexer (423), and the output is connected to the second input of the multiplexer (424). The BMRF control inputs are connected to the corresponding inputs of the demultiplexer (423), the first (421) and second (422) MRFs and the multiplexer (424).

Figure 5:
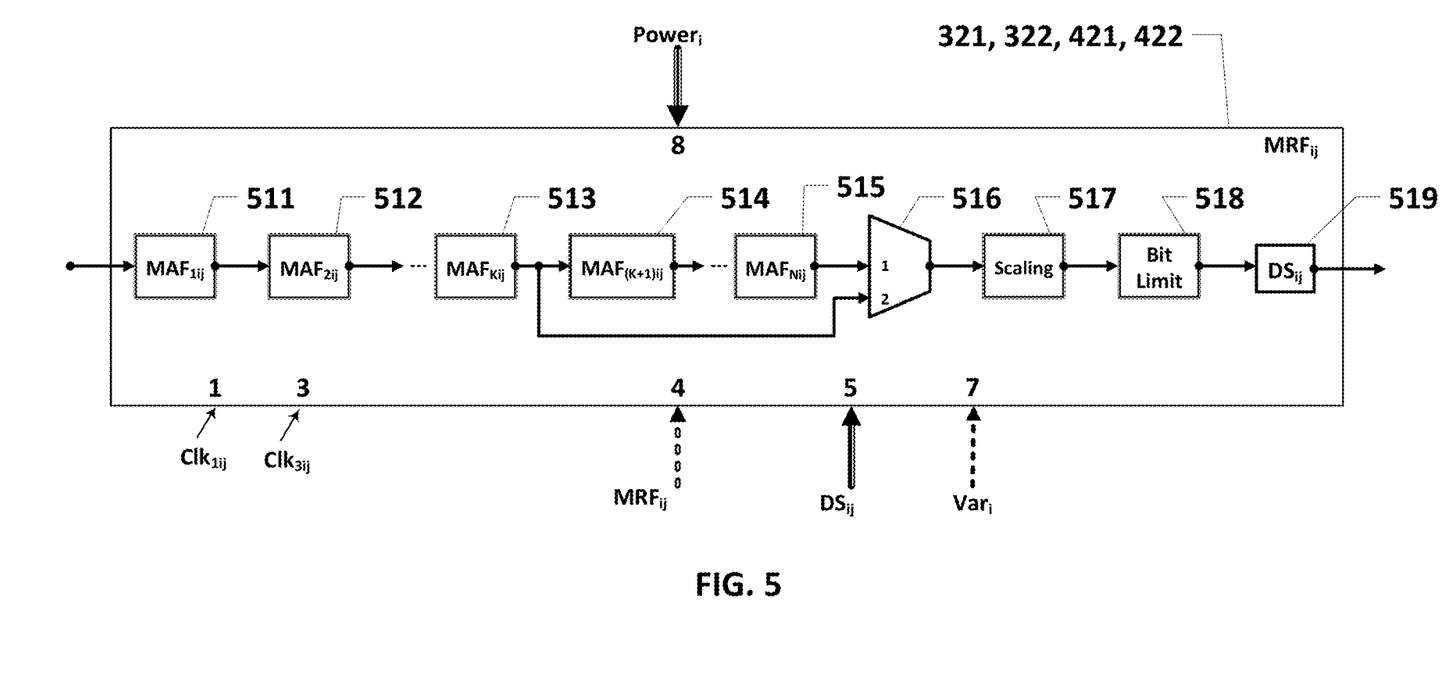
FIG. 5 shows a structural diagram of an embodiment of a MultiRate Filter (MRF) on the basis of Moving Average Filters (MAF).

Another embodiment of the MultiRate Filter (MRF) (321, 322, 421, 422) is based on Moving Average Filters (MAF) considers the case when a block MRF is made in the form of series-connected N MAF filters (511), (512), (513), (514), (515) of different orders, a commutator (516), a scaling block (517), a bit limit block (518), and a down sampler block (519), whose output is the output of MRF, the output of the k-th MAF filter (513) is connected to the second input of commutator (516). Control inputs of the MRF are connected to the corresponding control inputs of the MAF filters (511), (512), (513), (514), (515), the commutator (516), the scaling block (517), bit limit block (518), and the down sampler block (519).

Figure 6:
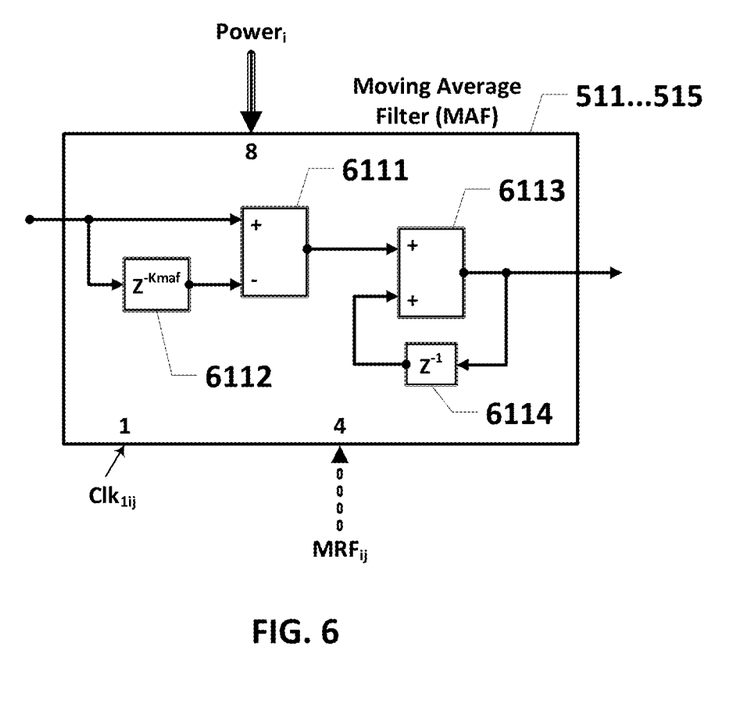
FIG. 6 shows a structural diagram of an embodiment for a Moving Average Filter (MAF).

The MAF filters (511), (512), (513), (514), (515) can be implemented as a series connection of a subtraction block (6111) and a summation block (6113), the summing input of the subtraction block (6111) being the input of the MAF-filter, and the output of the summation block (6113) being the output of MAF filter which additionally includes a delay block in $K_{maf}$ clocks (6112), the input of which is connected to the MAF input, and the output—to the subtracting input of the subtraction block (6111), as well as one-clock delay block (6114), the input of which is connected with the output of summation block (6113), and the output—with the second summating input of the same summation block (6113). MAF control inputs are connected to the corresponding control inputs of subtraction (6111) and summation (6113) blocks and delay blocks.

Figure 7:
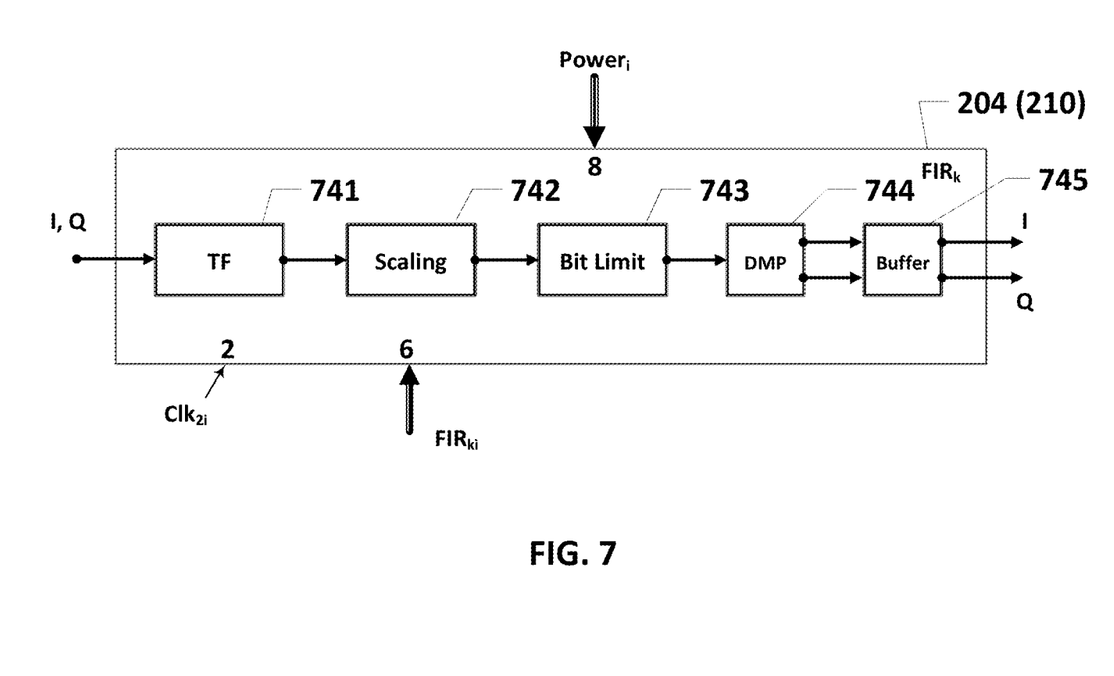
FIG. 7 shows a structural diagram of FIR (Finite Impulse Response)-filter.

When in-phase and quadrature samples are series-transmitted in one channel, FIR filters (204), (210) can be made in the form of series-connected transversal filter (741), scaling block (742), bit limit block (743), demultiplexer (744), buffer block (745). Control inputs of FIR filter are connected to the corresponding control inputs of transversal filter (741), scaling block (742), bit limit block (743), demultiplexer (744), and buffer block (745).

Figure 8:
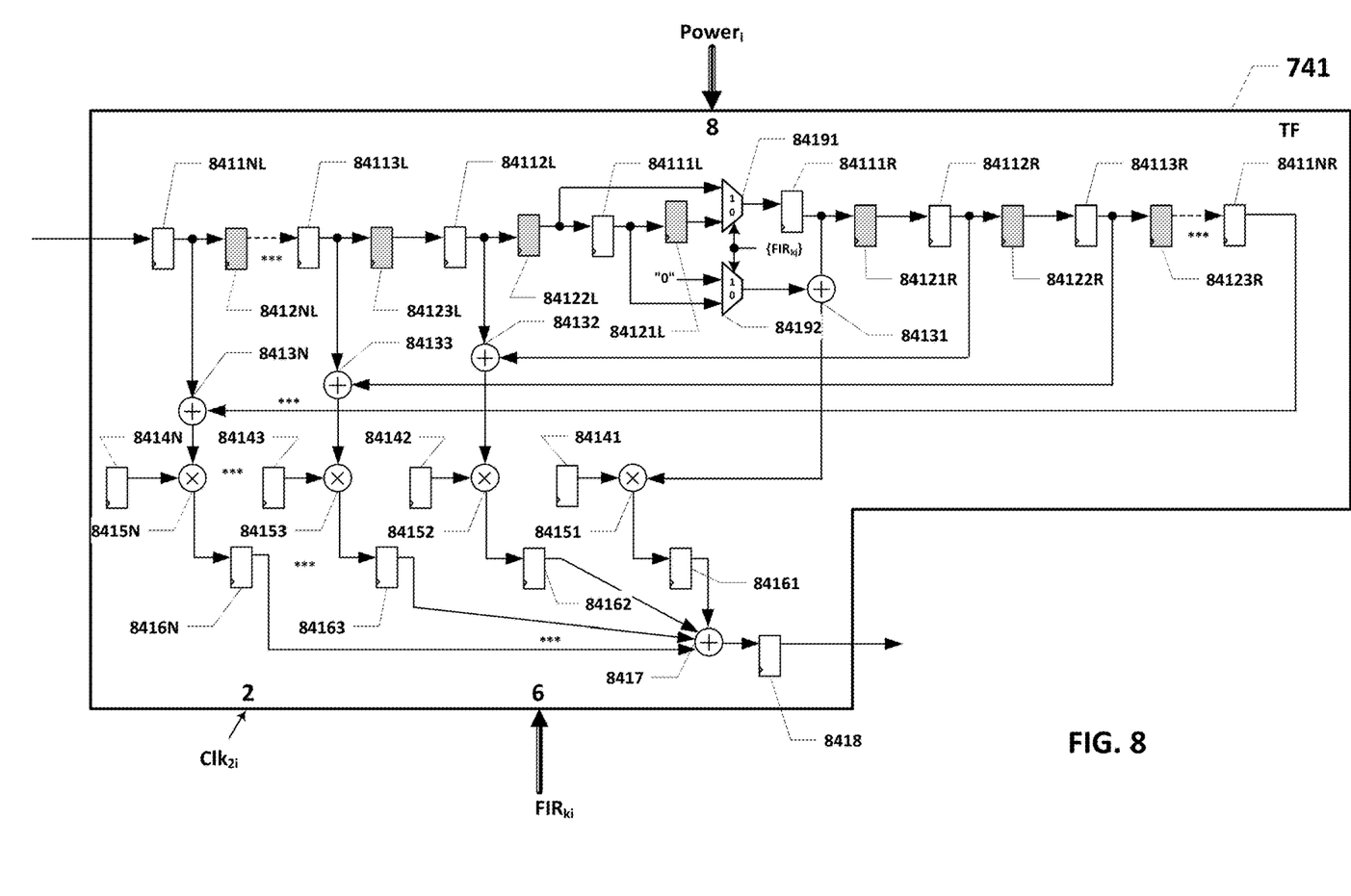
FIG. 8 shows an embodiment of a transversal filter for the case of series-transmission of in-phase and quadrature components of the input signal in one line.

The transversal filter (741) in case of series-transmitting in-phase and quadrature samples of the input signal in one channel can be implemented in the form of the first chain of series-connected N-pairs of registers (8411iL) and (8412iL), i=N . . . 1, as well as the second chain of series connected N-pairs of registers (8411iR) and (8412iR), i=1 . . . N, the second register (8412NR) in the last pair of the registers being absent, the input of the N-th register (8411NL) being the input of the transversal filter (741), the output of the second register (84122L) of the second pair of the first register chain is connected to the first input of the first commutator (84191), the output of the second register (84121L) of the first pair of the first register chain is connected to the second input of the first commutator (84191), the output of the first register (84111L) of the first pair of the first register chain is connected to the second input of the second commutator (84192), to the first input of which some potential corresponding to the logic 0 is fed, the output of first commutator (84191) is connected to the input of first register (84111R) of the first register pair of the second chain of series connected N-pairs of registers, and the output of second commutator (84192) is connected to the first input of first summation block (84131), the second input of which is connected to the output of the first register (84111R) of the first register pair of the second chain of series-connected N-pairs of registers, the outputs of the first register of the i-th register pair of the first chain of series connected N-pairs of register (8411iL) and (8412iL) and the first register of the i-th register pair of the second chain of series connected N-register pairs (8411iR) and (8412iR) being correspondingly connected to the first and second inputs of summation blocks (8413i) for all i=2 . . . N, the outputs of summation blocks (8413i) for all i=1 . . . N are connected to the first inputs of multipliers (8415i), register (8414i), wherein coefficients of the transversal filter are stored, are connected to the second inputs of multipliers (8415i), the outputs of multipliers (8415i) are connected to the corresponding inputs of summation block (8417) via buffer register (8416i), the output of which is connected to the input of buffer register (8418), whose output is the output of the transversal filter (741). Control inputs of transversal filter (741), through which clock signals of the second type $Clk_{2i}$ and a vector of parameters for the digital filter $FIR_{ki}$, are fed, are connected to the corresponding control inputs of blocks being included in the transversal filter (741).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is directed to a universal programmatically-controlled structure comprising a chain of programmatically-controlled Block of MultiRate Filters (BMRF) providing a required amplitude-frequency response (AFR) and coefficient of decimation for each assigned version, and a chain of FIR (Finite Impulse Response) filters operating on down sampling frequency and ensuring a final required AFR.

Figure 1:
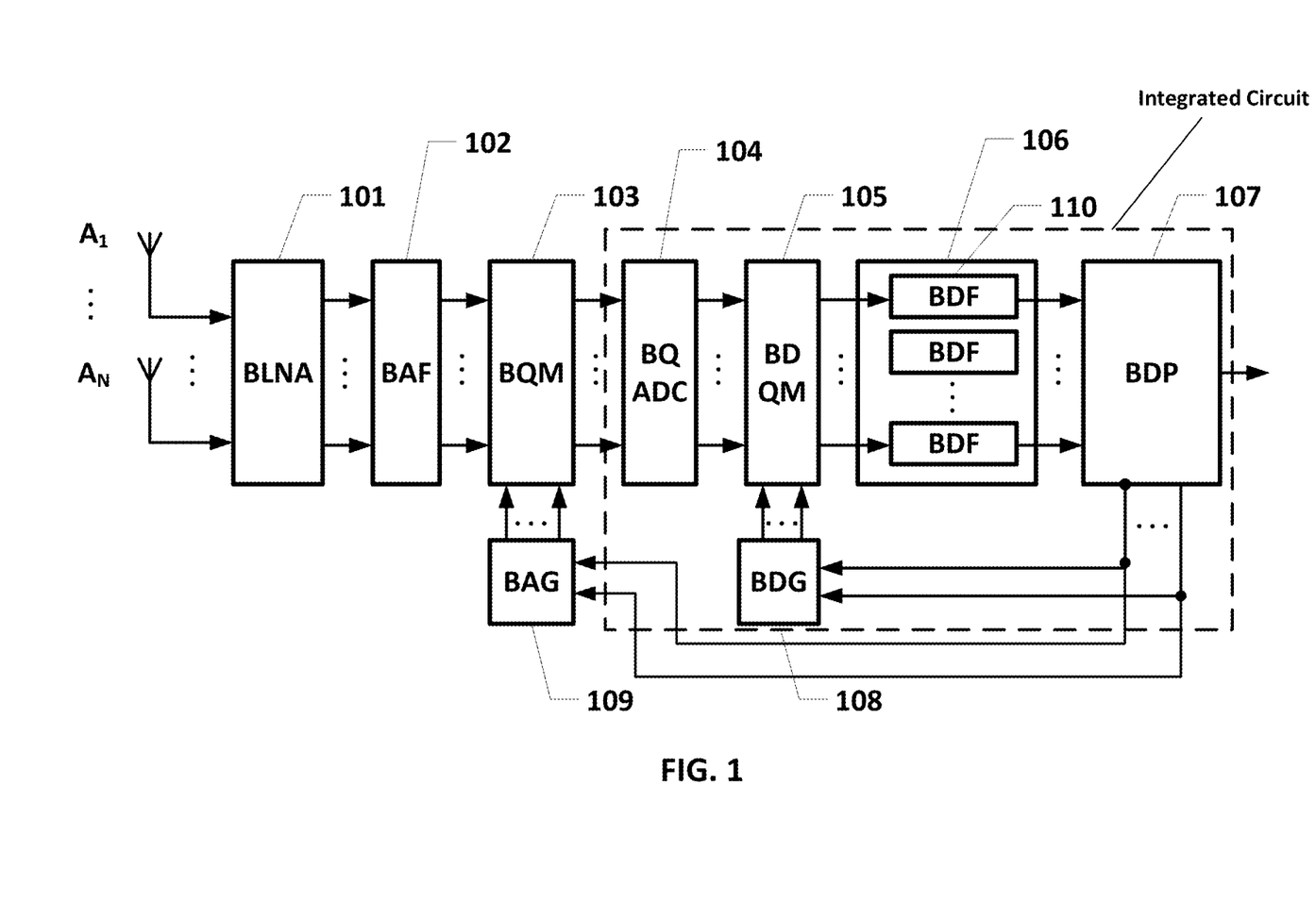
FIG. 1 shows a general block-diagram of a multi-system navigation receiver with integrated data transmission system comprising.

The proposed invention can be implemented as a receiver in accordance with the structural diagrams in FIGS. 1-8. FIG. 1 shows a general block-diagram of a multi-system navigation receiver with integrated data transmission system. In FIG. 1:

$A_1 \ldots A_N$ are antennas;
BLNA is a Block of Low Noise Amplifiers (101);
BAF is a Block of Analog Filters (102);
BQM is a Block of Quadrature Mixers (103);
BQADC is a Block of Quadrature Analog-to-Digital Converters (104);
BDQM is a Block of Digital Quadrature Mixers (105);
BDF is a Block of Digital Filters (110);
BDP is a Block of Digital Processing (107);
BDG is a Block of Digital Generators (108);
BAG is a Block of Analog Generators (109).

Signals from navigation satellites and base stations (sources of differential corrections) are received by antennas $A_1 \ldots A_N$ and amplified by a Block of Low Noise Amplifiers (BLNA) (101). Then signals of each channel are filtered in a corresponding filter of a Block of Analog Filters (BAF) (102), transmitted in a range of intermediate frequencies (tens of MHz) by a Block of Quadrature Mixers (BQM) (103) and Block of Analog Generators (BAG) (109), converted in a Block of Quadrature Analog-to-Digital Converters (BQADC) (104). The digital signal in the form of in-phase (InPhase) and quadrature (Quadrature) sample components is shifted in each channel along the frequency axis in an interval assigned in a Block of Digital Quadrature Mixers (BDQM) (105). After that, in each channel of the Block of Digital Filters (BDF) (110), an isolation of the needed area of spectral range is done and discretization frequency is down-sampled (by ×2, ×4, etc). The signal so isolated is then processed in a Block of Digital Processing (BDP) (107) to calculate the coordinates of the receiver (and optionally other derived information, such as velocity), as is well known in the art.

One problem in designing such receivers is to provide versatility and multi-functionality of controlling characteristics of each channel. In particular, BDF can function with different AFR and decimation coefficients, and these characteristics are changeable during operation.

For example, multi-functional navigation receivers provide navigation signals reception in the following frequency bands: GPS L1C, GPS C/A, QZSS L1C, QZSS C/A, Galileo L1 (1575.4 MHz), GLONASS C/A (1602 MHz), Beidou B1 (1561.MHz), GPS L5 (1176.5), GLONASS L3 (1202.0 MHz), GLONASS C/A L2 (1246.4), Galileo E5A, IRNSS SPS, IRNSS RS (1176.45 MHz) and so on. Base stations transmitting differential corrections typically transmit at frequencies of 400, 600 MHz, or 900 MHz, etc.

Bandwidths of passband filters used in navigation channels lie within range from a few MHz up to thirty (and occasionally more) MHz, and the bandwidth of data transmission channels can be from tens of kHz up to tens of MHz.

A possible method of solving this problem is to implement a block of digital filters (BDF) shown in FIG. 1 as programmable structures. To do this, at the stage of designing BDF, a list of functional versions for this block is determined. Each version is characterized by a set of parameters describing configuration of decimating part comprising BMRF chain (202, 206, 207, 209), structure and parameters of each BMRF, as well as configuration and parameters of FIR filters (204, 205). A set of this data is stored in table form in Control Block (211) of FIG. 2. Each version can correspond to a row of the table. For example, for each possible functional variation, the table can store data about the input sampling frequency, output sampling frequency, filter bandpass properties, number and parameters of the MAF filters, decimation coefficients, scaling coefficients, weight coefficients of the FIR filters, etc.

When the block of digital filters is initialized, the number of BDF's functional version NVar is fed to the input of the Control Block (211). Data read from the data table are fed to the corresponding outputs of the Control block (211) in accordance with their purpose and then—uploaded to the corresponding registers of blocks forming BDF (FIG. 2). Control of BDF is implemented with commutators (201, 203, 205, 208), whose control signals are included in sets of corresponding parameters generated by Control Block (211) for each version of BDF designs.

Moreover, for each version Control Block (211) generates a set of clock signals $Clk_{1ij}$, $Clk_{2i}$, $Clk_{3ij}$, The first clock signal controls operation of MultiRate Filters (MRF) in BMRF (FIGS. 2, 3, 4, 5) before decimation, the third one controls decimation and further signal processing. The second clock signal controls operation of FIR filters.

A general block-diagram of BDF is shown in FIG. 2 and contains first (201), first block of MultiRate Filters—BMRF (202), second commutator (203), first filter with Finite Impulse Response (FIR filter) (204) and third commutator (205), the inputs of first commutator (201) being the inputs of BDF, and the output of third commutator (205)—to its output, the output of first BMRF (202) is also connected to the signal input of second BMRF (206), the output of which is connected to the second input of second commutator and the signal input of the third BMRF (207), whose output is connected to the third input of second commutator (203) and the first input of the fourth commutator (208), whose output in turn is connected to the fourth input of second commutator (203) via the fourth BMRF (209), the second input of fourth commutator (208) is connected to the input of the first commutator (201), and the output of the first FIR filter through the second FIR filter is connected to the second input of third commutator (205).

Control Block (211) based on pre-written data files and the number of BDF version NVar fed to the input of Control Block (211) generates signals to control separate elements of BDF, the Control Block (211) having eight outputs; clock signals of the first type $Clk_{1ij}$ corresponding to the sampling frequency of BMRF input signals being taken from the first output, clock signals of the second type $Clk_{2i}$ corresponding to the sampling frequency of FIR filters being taken from the second output, clock signals of the third type $Clk_{3ij}$ corresponding to the output sampling frequency of BMRF is taken from the third output, a vector of $MRF_{ij}$ parameters describing settings of BMRF blocks is taken from the fourth output, a vector of $DS_{ij}$ parameters describing decimation characteristics in BMRF blocks being taken from the fifth output, a vector of $FIR_{ki}$ parameters describing parameters and coefficients of FIR filters being taken from the sixth output, and a vector of $Power_i$ parameters controlling power supply to separate elements of BDF is taken from the seventh output. Index i determines the number of functional number of BDF, index j determines the number of BMRF block, and index k determines the number of FIR filter.

The control outputs of the control block (211) are connected to the corresponding inputs of blocks being included in BDF.

Depending on the number NVar of the assigned BDF functional version, different structures can be implemented from available BMRFs providing different AFR and decimation coefficients at the output of commutator (203).

When in-phase and quadrature components of the input signal are transmitted in separate channels, the Block of MultiRate Filters (BMRF) (202, 206, 207, 209) can be implemented in the form of two parallel channels each of which contains a MultiRate Filter (MRF), (321) and (322) correspondingly (FIG. 3). BMRF control inputs are connected to the corresponding control inputs of first (321) and second (322) MRFs.

When the in-phase and quadrature components of the input signal are series-transmitted in the same channel, a Block of MultiRate Filters (BMRF) (202, 206, 207, 209) can be implemented (see FIG. 4) in the form of series-connected demultiplexer (423), first MultiRate Filter (MRF) (421), and multiplexer (424), the input of demultiplexer (423) being the input of BMFR, and the output of multiplexer (424) being its output, and BMRF contains another MRF (422), the input of which is connected with the second output of demultiplexer (423), and the output—with the second input of multiplexer (424). BMRF control inputs are connected to the corresponding inputs of demultiplexer (423), first (421) and second (422) MRFs and multiplexer (424).

In this case the input stream of samples in demultiplexer (423) is divided into two streams, the first one containing samples of the in phase component I, and the other one samples of the quadrature component Q. Then the both components are decimated in MultiRate Filters (MRF) (421) and (422). After filtering the streams are combined into one stream in multiplexer (424).

Cascaded integrator-comb (CIC) filters, Sharpened CIC-filters (SCIC), as well as some other decimating filters, in particular, MRF on the basis of a chain of MAF filters, can be used as MultiRate Filters.

FIG. 5 shows a block-diagram of a MultiRate Filter (MRF) implementation on the basis of MAF filters. In this case a block MRF is made in the form of series-connected N different order MAF filters (511), (512), (513), (514), (515), commutator (516), scaling block (517), bit limit block (518), and down sampler block (519), whose output is the output of MRF, the output of the k-th MAF filter (513) is connected with the second input of commutator (516). Control inputs of MRF are connected with the corresponding control inputs of MAF filters (511), (512), (513), (514), (515), commutator (516), scaling block (517), bit limit block (518), and down sampler block (519).

The MRF based on MAF filters is a set of series-connected MAF filters having program-changeable parameters. FIG. 5 shows an embodiment of such a filter for the case when a chain of MAF filters can be selected from two versions. Each version normally corresponds to a specific decimation coefficient. The selection of a version is done by commutator (516) and assigning a vector of parameters $K_{maf}$ for MAF filters.

A signal from the output of commutator (516) is multiplied by the pre-set coefficient in Scaling block (517), and then in Bit Limit block (518) the pre-set number of high bits is isolated. After that in Down Sampler block (519) sample decimation is produced using the pre-set decimation coefficient.

All programmable parameters are read from the corresponding tables via control inputs (4), (5), (7). For the sake of reducing power consumption, supply control to the blocks at issue is carried out through control input (8) in accordance with the applied functional version. Clock signals according to the version being used are fed via control inputs (1) and (3) respectively to blocks functioning on high input sampling frequency (e.g., 100 Megasamples per second) and on low (decimated) sampling frequency (for example, 50 Megasamples per second, or 25 Megasamples per second, in this example).

An example of each Moving Average Filter (MAF) (511), (512), (513), (514), (515) is shown in FIG. 6. These blocks are series-connected and include a subtraction block (6111) and a summation block (6113), the summing input of the subtraction block (6111) being the input of the MAF filter, and the output of the summation block (6113) being the output of MAF filter which additionally includes a delay block in $K_{maf}$ clocks (6112), whose output is connected to the MAF input, and the output—to the subtracting input of the subtraction block (6111), as well as one-clock cycle delay block (6114), whose input is connected with the output of summation block (6113), and the output is connected to the second summating input of the same summation block (6113). MAF control inputs are connected to the corresponding control inputs of the subtraction (6111) and summation (6113) blocks and the delay blocks.

The parameter determining frequency-selectivity of MAF filter is $K_{maf}$, which describes the size of the "window" in the MAF filter and transmitted through control input (4).

When in-phase and quadrature samples are series-transmitted in the same channel, digital FIR filters (204), (210) can be made (FIG. 7) in the form of series-connected transversal filter (741), scaling block (742), bit limit block (743), demultiplexer (744), buffer block (745). Control inputs of the FIR filter are connected to the corresponding control inputs of a transversal filter (741), a scaling block (742), a bit limit block (743), a demultiplexer (744), and a buffer block (745).

The FIR filters (204) and (210) operate as follows: a sequence of in-phase and quadrature samples following one another is fed to the transversal filter (741), the output signal of which is scaled by multiplication by the pre-set constant coefficient in Scaling block (742). High bits thus are fully used in the representation of output samples of transversal filter (741). The bit Limit block (743) provides generation of samples of pre-set digit length on the basis of high bits. The demultiplexer (744) and the buffer block (745) ensure division of the data stream into two separate streams corresponding to in-phase I and quadrature Q components of the received signal. These samples being filtered in BDF are fed to the corresponding inputs of a Block of Digital Processing (BDP) (107) for further digital processing.

The transversal filter (741) in case of series-transmitting in-phase and quadrature samples of the input signal in one channel can be implemented (see FIG. 8) in the form of a first chain of series connected N-pairs of registers (8411$i$L) and (8412$i$L), i=N . . . 1, as well as the second chain of series connected N-pairs of registers (8411$i$R) and (8412$i$R), i=1 . . . N, the second register (8412NR) in the second pair of the registers being missing, the input of the N-th register (8411NL) being the input of the transversal filter (741), the output of the second register (84122L) of the second pair of the first register chain is connected to the first input of the first commutator (84191), the output of the second register (84121L) of the first pair of the first register chain is connected to the second input of the first commutator (84191), the output of the first register (84111L) of the first pair of the first register chain is connected to the second input of the second commutator (84192), to the first input of which some potential corresponding to the logic 0 is fed, the output of first commutator (84191) is connected to the input of first register (84111R) of the first register pair of the second chain of series connected N-pairs of registers, and the output of second commutator (84192) is connected to the first input of first summation block (84131), the second input of which is connected to the output of the first register (84111R) of the first register pair of the second chain of series-connected N-pairs of registers, the outputs of the first register of the i-th register pair of the first chain of series connected N-pairs of register (8411$i$L) and (8412$i$L) and the first register of the i-th register pair of the second chain of series connected N-register pairs (8411$i$R) and (8412$i$R) being correspondingly connected to the first and second inputs of summation blocks (8413$i$) for all i=2 . . . N, the outputs of summation blocks (8413$i$) for all i=1 . . . N are connected to the first inputs of multipliers (8415$i$), register (8414$i$), wherein coefficients of the transversal filter are stored, are connected to the second inputs, the outputs of multipliers (8415$i$) are connected to the corresponding inputs of summation block (8417) via buffer register (8416$i$), the output of which is connected to the input of buffer register (8418), whose output is the output of the transversal filter (741).

Control inputs of transversal filter (741), through which clock signals of the second type $Clk_{2i}$ and a vector of parameters for the digital filter $FIR_{ki}$, are fed, are connected to the corresponding control inputs of blocks being included in the transversal filter (741).

This embodiment of transversal filter provides an efficient implementation of the filter from the viewpoint of used FPGA/ASIC resources, since it is equivalent to two filters used for processing in-phase I and quadrature Q components of the received signal. At the same time it has the same number of multipliers and summation blocks as that of a single filter. Moreover, this filter can be used to implement digital filters with symmetrical impulse response both in case of odd and even numbers of samples in the impulse response.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A multisystem navigation receiver, the receiver comprising:
   (i) an antenna block including a plurality of antennas for receiving GNSS signals from different satellite constellations and signals from differential correction transmitters,
   (ii) a block of Low Noise Amplifiers (BLNA) for amplifying the received signals,
   (iii) a Block of Analog Filters (BAF) for filtering the amplified received signals,
   (iv) a Block of Quadrature mixers (BQM) for translating in-phase and quadrature signals, representing the amplified GNSS signals, to an intermediate frequency,
   (v) a Block of Quadrature Analog-to-Digital Converters (BQADC) for digitizing the in-phase and quadrature signals from the BQM at the intermediate frequency,
   (vi) a Block of Digital Quadrature Mixers (BDQM) for shifting the digitized in-phase and quadrature signals from the intermediate frequency to a zero frequency,
   (vii) a Set Block of Digital Filters (SBDF) for band-pass filtering the shifted digitized in-phase and quadrature signals from the BDQM, and for reducing a sampling rate of the shifted digitized in phase and quadrature signals,
   (viii) a Block of Digital Processing (BDP) for calculating a position of the navigation receiver based on an output of the SBDF,
   all the elements (i) (viii) connected in series;
   (ix) a Block of Digital Generators (BDG) for receiving inputs from the BDP and whose outputs provide for fine control of the BDQM, and
   (x) a Block of Analog Generators (BAG) for outputting harmonic signals that define which received signal, in each channel, is processed by its corresponding BQM,
   wherein the SBDF includes a plurality of independent Blocks of Digital Filters (BDF), each BDF including
   (a) a chain of Blocks of MultiRate Filters (BMRF) providing anti-aliasing filtering and down-sampling of the shifted digitized in phase and quadrature signals,
   (b) programmable commutators for configuring the BMRF and controlling decimation of the down-sampled signals from the BMRF, and
   (c) a chain of FIR-filters for filtering the down-sampled signals,
   each BDF being controlled by a control block generating control signals for components of the BDF based on pre-written data and an assigned number fed to the control block.

2. The navigation receiver of claim 1, wherein the in-phase and quadrature signals are processed in separate channels, and a corresponding BMRF includes two channels, each of which includes its own MultiRate Filter (MRF), and wherein control inputs of the corresponding BMRF are connected to the corresponding control inputs of the MRFs.

3. The navigation receiver of claim 1, wherein the in-phase and quadrature signals are processed in the same channel, the BMRF includes a demultiplexer, a first Multi-Rate Filter (MRF), and a multiplexer, all connected in series, and the BMRF a second MRF, whose input is connected to a first input of the demultiplexer, and whose output is connected to a second input of the multiplexer.

4. The navigation receiver of claim 3, wherein the MRF is implemented using MAF filters, such that an MRF block includes N Moving Average Filters (MAFs) of different order, a commutator, a scaler, a bit limiter, and a down sampler, all connected in series,
  wherein an output of an Nth MAF is connected to a first input of the commutator, and
  wherein an output of a k-th MAF is connected to a second input of the commutator.

5. The navigation receiver of claim 4, wherein blocks of the MAF include a subtractor and a summer, connected in series, a summing input of the subtractor being a input of the MAF, and an output of the summer being an output of MAF,
  wherein the MAF further includes a delay block for $K_{maf}$ clock cycles whose input is connected to the MAF input, and whose output is connected to a subtracting input of the subtractor,
  wherein the MAF further includes a one clock cycle delay block whose input is connected to the output of the summer, and whose output is connected to another input of the summer.

6. The navigation receiver of claim 1, wherein the in-phase and quadrature signals are processed in the same channel, each of the FIR filters includes a transversal filter, a scaler, a bit limiter, a demultiplexer, and a buffer, all connected in series.

7. The navigation receiver of claim 6, wherein the transversal filter includes a first chain of N-pairs of registers, connected in series, and a second chain of N-pairs of registers, all connected in series,
  wherein a second register in a last pair of the registers is missing, and
  wherein
  an input of the N-th register is an input of the transversal filter,
  an output of a second register of the second pair of the first chain is connected to a first input of a first commutator,
  an output of a second register of the first pair of the first register chain is connected to a second input of the first commutator,
  an output of a first register of the first pair of the first register chain is connected to a second input of a second commutator, and whose first input receives a logic 0,
  an output of the first commutator is connected to an input of a first register of a first register pair of the second chain, and
  an output of the second commutator is connected to a first input of a first summer, a second input of the first summer is connected to an output of a first register of a first register pair of the second chain,
  outputs of a first register of an i-th register pair of the first chain and a first register of an i-th register pair of the second chain are correspondingly connected to first and second inputs of summers,
  outputs of the summers are connected to first inputs of multipliers and to registers that store coefficients of the transversal filter, and are connected to second inputs of the multipliers,
  outputs of the multipliers are connected to the corresponding inputs of the summers via a first buffer register, whose output is connected to an input of a second buffer register, whose output is the output of the transversal filter.

8. A navigation receiver comprising:
  (i) a plurality of antennas for receiving GNSS signals from multiple satellite constellations and signals from differential correction transmitters,
  (ii) low noise amplifiers for amplifying the received signals,
  (iii) a plurality of analog filters for filtering the amplified received signals,
  (iv) analog quadrature mixers for translating in phase and quadrature signals corresponding to the amplified GNSS signals to an intermediate frequency,
  (v) a Block of Quadrature Analog-to-Digital Converters (BQADC) for digitizing the in phase and quadrature signals at the intermediate frequency,
  (vi) a Block of Digital Quadrature Mixers (BDQM) for shifting the digitized in phase and quadrature signals to a zero frequency,
  (vii) a Set Block of Digital Filters (SBDF) for band-pass filtering the digitized in phase and quadrature signals at the zero frequency, and reducing their sampling rate,
  (viii) a Block of Digital Processing (BDP) for calculating coordinates based on an output of the SBDF,
  all the elements (i)-(viii) connected in series;
  (ix) a Block of Digital Generators (BDG) after the BDP, whose outputs provide for fine control of the BDQM, and
  (x) a Block of Analog Generators (BAG) that outputs harmonic signals that define which received signal is processed by a particular analog quadrature mixer,
  wherein the SBDF includes a plurality of Blocks of Digital Filters (BDF), each BDF including
  (a) a chain of Blocks of MultiRate Filters (BMRF) for anti-alias filtering and down-sampling of the signals from the BDQM,
  (b) programmable commutators for configuring the BMRF and controlling decimation of the down-sampled signals from the BMRF, and
  (c) FIR-filters for filtering the down-sampled signals,
  each BDF being controlled by a control block generating control signals for components of the BDF based on pre-written data.

9. A navigation receiver comprising:
  (i) a plurality of antennas for receiving GNSS signals from multiple satellite constellations and signals from differential correction transmitters,
  (ii) low noise amplifiers for amplifying the received GNSS signals,
  (iii) a plurality of analog filters for filtering the amplified received signals,
  (iv) analog quadrature mixers for translating in-phase and quadrature signals corresponding to the filtered GNSS signals to an intermediate frequency,
  (v) analog-to-digital converters for digitizing the translated in-phase and quadrature signals at the intermediate frequency,
  (vi) digital quadrature mixers for shifting the digitized in-phase and quadrature signals to a zero frequency, (vii) a Set Block of Digital Filters (SBDF) for filtering interference close to a spectrum of the GNSS signal in the digitized in-phase and quadrature signals at the zero frequency, and (viii) a processor for calculating coordinates based on the filtered digitized in-phase and quadrature signals from the SBDF.

10. The receiver of claim 9, wherein the SBDF performs band-pass filtering of the digitized in-phase and quadrature signals.

11. The receiver of claim 9, wherein the SBDF reduces a sampling rate of the digitized in-phase and quadrature signals.

12. The receiver of claim 9, wherein the SBDF performs anti-alias filtering and down-sampling of the digitized in-phase and quadrature signals.

13. The receiver of claim 9, further comprising analog generators producing harmonic signals that define which received signal is processed by a particular analog quadrature mixer.

14. The receiver of claim 9, wherein the SBDF includes a plurality of independent Blocks of Digital Filters (BDF), each BDF including (a) a chain of Blocks of MultiRate Filters (BMRF) providing anti-aliasing filtering and down-sampling of the shifted digitized in-phase and quadrature signals, (b) programmable commutators for configuring the BMRF and controlling decimation of the down-sampled signals from the BMRF, and (c) a chain of FIR-filters for filtering the down-sampled signals.

15. The receiver of claim 14, wherein each BDF is controlled by a control block generating control signals for components of the BDF based on pre-written data and an assigned number fed to the control block.

16. The receiver of claim 14, wherein the in-phase and quadrature signals are processed in separate channels, and a corresponding BMRF includes two channels, each of which includes its own MultiRate Filter (MRF), and wherein control inputs of the corresponding BMRF are connected to the corresponding control inputs of the MRFs.

17. The navigation receiver of claim 14, wherein the in-phase and quadrature signals are processed in the same channel, the BMRF includes a demultiplexer, a first MultiRate Filter (MRF), and a multiplexer, all connected in series, and the BMRF a second MRF, whose input is connected to a first input of the demultiplexer, and whose output is connected to a second input of the multiplexer.

18. The navigation receiver of claim 17, wherein the MRF is implemented using MAF filters, such that an MRF block includes N Moving Average Filters (MAFs) of different order, a commutator, a scaler, a bit limiter, and a down sampler, all connected in series, wherein an output of an Nth MAF is connected to a first input of the commutator, and wherein an output of a k-th MAF is connected to a second input of the commutator.

19. The navigation receiver of claim 18, wherein blocks of the MAF include a subtractor and a summer, connected in series, a summing input of the subtractor being a input of the MAF, and an output of the summer being an output of MAF, wherein the MAF further includes a delay block for $K_{maf}$ clock cycles whose input is connected to the MAF input, and whose output is connected to a subtracting input of the subtractor, wherein the MAF further includes a one clock cycle delay block whose input is connected to the output of the summer, and whose output is connected to another input of the summer.

20. The navigation receiver of claim 14, wherein the in-phase and quadrature signals are processed in the same channel, each of the FIR filters includes a transversal filter, a scaler, a bit limiter, a demultiplexer, and a buffer, all connected in series.

21. The navigation receiver of claim 20, wherein the transversal filter includes a first chain of N-pairs of registers, connected in series, and a second chain of N-pairs of registers, all connected in series, wherein a second register in a last pair of the registers is missing, and wherein an input of the N-th register is an input of the transversal filter, an output of a second register of the second pair of the first chain is connected to a first input of a first commutator, an output of a second register of the first pair of the first register chain is connected to a second input of the first commutator, an output of a first register of the first pair of the first register chain is connected to a second input of a second commutator, and whose first input receives a logic 0, an output of the first commutator is connected to an input of a first register of a first register pair of the second chain, and an output of the second commutator is connected to a first input of a first summer, a second input of the first summer is connected to an output of a first register of a first register pair of the second chain, outputs of a first register of an i-th register pair of the first chain and a first register of an i-th register pair of the second chain are correspondingly connected to first and second inputs of summers, outputs of the summers are connected to first inputs of multipliers and to registers that store coefficients of the transversal filter, and are connected to second inputs of the multipliers, outputs of the multipliers are connected to the corresponding inputs of the summers via a first buffer register, whose output is connected to an input of a second buffer register, whose output is the output of the transversal filter.

22. The receiver of claim 9, further comprising digital generators whose outputs provide for fine control of the digital quadrature mixers.

* * * * *